United States Patent
Kawachi et al.

(10) Patent No.: US 6,175,465 B1
(45) Date of Patent: Jan. 16, 2001

(54) HEAD POSITIONING CONTROL SYSTEM FOR USE IN A DISK STORAGE DRIVE

(75) Inventors: Hidetoshi Kawachi; Masahide Yatsu; Tatsuharu Kusumoto, all of Tokyo (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/086,529

(22) Filed: May 29, 1998

(30) Foreign Application Priority Data

Dec. 26, 1997 (JP) .................................................. 9-366786

(51) Int. Cl.[7] .................................................. G11B 5/596
(52) U.S. Cl. .................................... 360/77.08; 360/77.02
(58) Field of Search .............................. 360/77.08, 77.02, 360/77.07

(56) References Cited

U.S. PATENT DOCUMENTS

| | | | |
|---|---|---|---|
| 5,801,897 | * 9/1998 | Kanda et al. | 360/78.14 |
| 5,825,580 | * 10/1998 | Shibata | 360/77.08 |
| 5,892,634 | * 4/1999 | Ito et al. | 360/77.08 |
| 6,046,879 | * 4/2000 | Hampshire | 360/77.08 |

FOREIGN PATENT DOCUMENTS 8-195044   7/1996   (JP) .

* cited by examiner

Primary Examiner—Hoa T. Nguyen
Assistant Examiner—Dan I. Davidson
(74) Attorney, Agent, or Firm—Finnegan, Henderson, Farabow, Garrett & Dunner, L.L.P.

(57) ABSTRACT

A servo system uses a disk on which two pairs of burst data items A and B and burst data items C and D are prerecorded, and the servo system performs positioning control for positioning a head within a range of a track on a disk. The servo system sets a range of a track to be divided into a first area regarding the track center as a reference position, a second area regarding a boundary position between tracks as a reference position, and a third area regarding a middle position between the reference positions, as a reference position. In the first area, the servo system calculates position information of the head by a first calculation formula using the burst data items A and B. In the second area, the servo system calculates position information of the head by a second calculation formula using the burst data items C and D. Further, in the third area, the servo system calculates an average value of calculation results from the first and second calculation formulas, as position information.

4 Claims, 6 Drawing Sheets

HEAD POSITIONING CONTROL SYSTEM FOR USE IN A DISK STORAGE DRIVE

BACKGROUND OF THE INVENTION

The present invention relates to a head positioning control system applicable to a disk storage drive such as a hard disk drive (HDD) or the like, and particularly, to a head positioning control system (or servo-system) using a MR (magnetoresistive) head as a read head.

Conventionally, in a disk storage drive such as a HDD or the like, a magnetic head is used to write data on a disk as a storage medium and to read data from a disk. Other than a magnetic disk drive such as a HDD, a magneto-optical disk may be considered as a disk drive. As a practical example of the present invention, a HDD is cited in the following explanation.

In recent years, in order to realize a higher recording density, a head of a read/write separation type using a MR (magnetoresistive) head as a read head has been put to use. This type of head has a structure in which a read head (MR head) and a write head (inductive head) are equipped on a slider as a main body of the head.

In a HDD, when making access with specified data in a disk (to read or write data), operation for reading servo data previously recorded on a disk is read by a read head. A CPU of the HDD uses the servo data read by the read head, to make positioning control by which the position of the read head on the disk is detected and the read head is moved to a target position to be accessed. The target position to be accessed means a track (or cylinder) specified for reading or writing data. In writing operation, the write head is positioned at a specified track, by the positioning control of the read head.

Head positioning control made by the CPU can be roughly divided into seek control (or speed control) for moving a head to a target track and track following control (or fine position control) for positioning the head to a certain range of the target track. The seek control uses a track address (or cylinder code) contained in servo data. Meanwhile, the position control (or track following control) uses servo burst data (a, b, c, and d) described later. The present invention relates to position control using servo burst data.

In the following, position control in a servo system (or head positioning control system) of a HDD will be briefly explained with reference to FIGS. 8 and 9.

As shown in FIG. 8, a number of coaxial tracks (N−1, N, N+1, are provided in a disk 1. In FIG. 8, the range from a position X1 to a position X5 corresponds to the range of a track N. A servo area is provided at a same position in the radial direction in each of the tracks. Servo areas are arranged with an equal intervals inserted between each other in the circumferential direction of the disk 1. Servo data including a cylinder code described above and servo burst data is previously recorded in the servo area (by a specialized servo writer when manufacturing a HDD). FIG. 8 shows only servo burst data (a, b, c, and d). In the following, burst patterns of items of the servo data are expressed as small letters a to d, and amplitude values (of digital values which will be explained later) reproduced from the burst pattern items are expressed as burst data items A to D. In each of the tracks, a data sector (which is an area for recording user data) is provided between the servo areas.

Servo burst data consists of burst patterns a and b arranged at right angles to the track center (which is the center X3 of the track N) as a reference, and burst patterns c and d arranged at right angles to a boundary position (X5 or X1) as a reference.

The servo system (CPU) makes seek control to move a read head 3 to the vicinity of a specified track (N), and then, sample-holds amplitude values corresponding to burst patterns a to d read out by the read head 3. The CPU inputs position data items A to D obtained by converting the amplitude values into digital values. Further, the CPU executes calculation processing (or positional displacement calculation) for detecting the position (or positional displacement from a reference position) of the read head 3 with use of the burst data items A to D obtained.

Specifically, when the read head 3 is positioned in the vicinity of the center (X3) of the track N, as shown in FIG. 8, the CPU inputs position data items A and B corresponding to burst pattern items a and b, and executes calculation of "PI=(A−B)/(A+B)". Position information PI calculated by the calculation is equivalent to a positional displacement amount E of the read head 3 from the center position X3 of the track N as a reference. The CPU executes position controls of the read head 3 so that the position displacement amount E is eliminated to zero.

Meanwhile, as shown in FIG. 8, as a HDD has come to have a higher recording density, the head width of the read head 3 has been decreased. Therefore, the relationship between the head width TW and a track pitch (or track width) satisfies "TP>TW". This track width TP is a track range for positioning the read head 3. When the head width TW and the track width TP thus satisfy the relationship of "TP>TW", the read head 3 is out of the range of the burst pattern b if the read head is in the vicinity of the position X5, and therefore, the burst data B is always zero. Therefore, the CPU cannot obtain proper position information PI from the calculation "PI=(A−B)/(A+B)". As for the CPU the vicinity of the position X5 in the track range is an insensible band in detection of the position of the read head 3. Therefore, the CPU executes calculation of "PI=(C−D)/(C+D)", using burst data items C and D corresponding to burst patterns c and d, to calculate a positional displacement amount E of the read head 3 from the track boundary position X5 (as shown in FIGS. 9 and 10). In FIGS. 9 and 10, the lateral axis denotes a head position (HP9) and the longitudinal axis denotes position information (or a position displacement) PI. Also, the continuous line 100 indicates position information based on a result of the calculation "PI=(A−B)/(A+B)" and the broken line 101 indicates position information based on a result of the calculation "PI=(C−D)/(C+D)". In FIG. 10, the broken line 101 indicates position information including a shift amount (+1) equivalent to half of one track.

As has been described above, since the relationship between the head width TW and the track width TP satisfies "TP>TW", the calculated position information PI is greater than the actual shift amount (E) of the read head 3, and this was confirmed from experiments. Hence, the CPU sets a position-conversion factor K and makes a correction by multiplying the position information by the factor K. Note that the position-conversion factor K is a fixed value set by TP and TW.

$$PI=\{(A-B)/(A+B)\}*K \qquad (1)$$

In correction of position information with respect to the position X5 as a reference, position information PI is naturally obtained by multiplying a result of "(C−D)/(C+D)" by the factor K. By improving the position conversion factor K, the CPU is capable of obtaining position information PI having a so-called linearity. In FIG. 11, the continuous line 111 indicates a calculation result of the calculation formula (1), and the broken line 112 indicates position information obtained by taking into consideration a shift amount (+0.5 track) of a half track.

As described above, in a servo system of a HDD, the CPU executes calculation processing related to position information for detecting a position of a read head (or position displacement amount from a reference position), with use servo burst data. In the calculation processing, the CPU uses a predetermined position factor K to calculate position information having a linearity. As a result of this, the CPU is capable of detecting accurately the position of a head from position information having a linearity, and of controlling positioning of a head with respect to a target position (which is normally the center position of a track range).

However, as described above, a MR head used as a read head in a HDD in recent years has a high read sensitivity so that this head can output a high reproduce level but the high read sensitivity is unstable. Specifically, as shown in FIG. 13, the output signal amplitude S is not uniform with respect to a read gap RG (equivalent to the head width of the read head). Therefore, the read head 3 has an output characteristic that levels are different between positions in the left and right sides of the read gap RG. Therefore, when the CPU calculates position information with use of servo burst data read out by the read head 3, position information having a linearity cannot be obtained with respect to a head position HP, as indicated by a continuous line 120 in FIG. 12. Note that a broken line 121 in FIG. 12 indicates a position information characteristic having an ideal linearity in position control of a servo system.

Meanwhile, as a HDD has come to have a larger storage capacity, a track pitch of a disk and a read gap RG of a read head have been decreased to be smaller, while the non-uniformity of the read sensitivity has been relatively enhanced in the read gap RG. In addition, due to manufacturing factors of a MR head, dispersion of the read sensitivity occurs frequently so that it is considered difficult to attain a uniform output sensitivity in the near future.

Hence, a position information characteristic obtained from the read head 3 is adjusted based on the read sensitivity characteristic of a MR head, as shown in FIG. 15. In FIGS. 14 and 15, contihuos lines 70 and 71 indicate calculation results concerning position information, using burst data items A and B, in case where a read head 3 is positioned in the vicinity of the center X3 of a track N. Continuos lines 70a and 71a respectively indicate position information characteristics each having an ideal linearity. Broken lines 80 and 81 indicate calculation results concerning position information, using burst data items C and D. Continuos lines 80a and 81a respectively indicate position information characteristics each having an ideal linearity. However, as shown in FIG. 15, the position information characteristic includes a non-linearity when the read head 3 is positioned in the vicinity of a position X4, even if the CPU adjusts the position information characteristics, based on the read sensitivity characteristic of the MR head.

Further, in practical use, recording of servo data onto an actual HDD is influenced by an external vibration or a limitation concerning pitch feed of a servo write. As a result, serve data recorded on the disk 1 already includes an error in comparison with an ideal state. Consequently, a problem occurs in that position information obtained by one of two pairs of burst data items a and B and c and d do not perfectly correspond to the other one of the pair. This causes a factor which deteriorates performance seek control, i.e., position control in the vicinity of the connecting point between them. An example of this problem is shown in FIG. 16. FIG. 16 indicates that the position information (characteristic) 72 corresponding the pair of burst data items A and B and that corresponding to the position information (characteristic) 82 are not continuous to each other when the read head 3 is positioned in the vicinity of the position X4. Note that position information characteristics 72a and 82a are respectively position information characteristics having an ideal linearity.

BRIEF SUMMARY OF THE INVENTION

An object of the present invention is to perform accurate head positioning control by obtaining position information having a linearity, in a system which performs positioning control of a head based on position information corresponding to a head position in a track range.

In order to achieve the object described above, the present invention provides a system for positioning control of a head in a disk storage drive, the drive having a disk prerecorded servo burst data, the system comprising: setting means for setting a calculation formula for calculating position information corresponding to a position of the head in a range of a specified track the head with use of the servo burst data, where the range of the specified track for positioning the head on the disk is divided into a plurality of areas, in a manner in which the position information as a calculation result from the calculation formula has a linearity for each of the areas; calculating means for selecting a calculation formula corresponding to an area in which the head is positioned within the range of the specified track, among calculation formulas set by the setting means, thereby to calculate position information corresponding to the position of the head within the range of the specified track; and control means for controlling the head to be positioned within the range of the specified track, based on the position information calculated by the calculating means.

In case where the system according to the present invention is applied to a servo system of a HDD, the system calculates position information having a linearity with respect to a head position, as a calculation result, by a calculation formula using burst data items A and B when the head is within an area (AR3) including a center of a specified track range. Also, the system calculates position information having a linearity with respect to a head position, as a calculation result, by a calculation formula using burst data items C and D when the head is within an area (AR5) including a boundary from an adjacent track. Further, when the head is in an intermediate area (AR4) between the above areas, position information having a linearity with respect to a head position is calculated as a calculation result, by a calculation formula using burst data items A, B, C, and D.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, first to third embodiments of the present invention will be explained with reference to the drawings.

Figure 1:
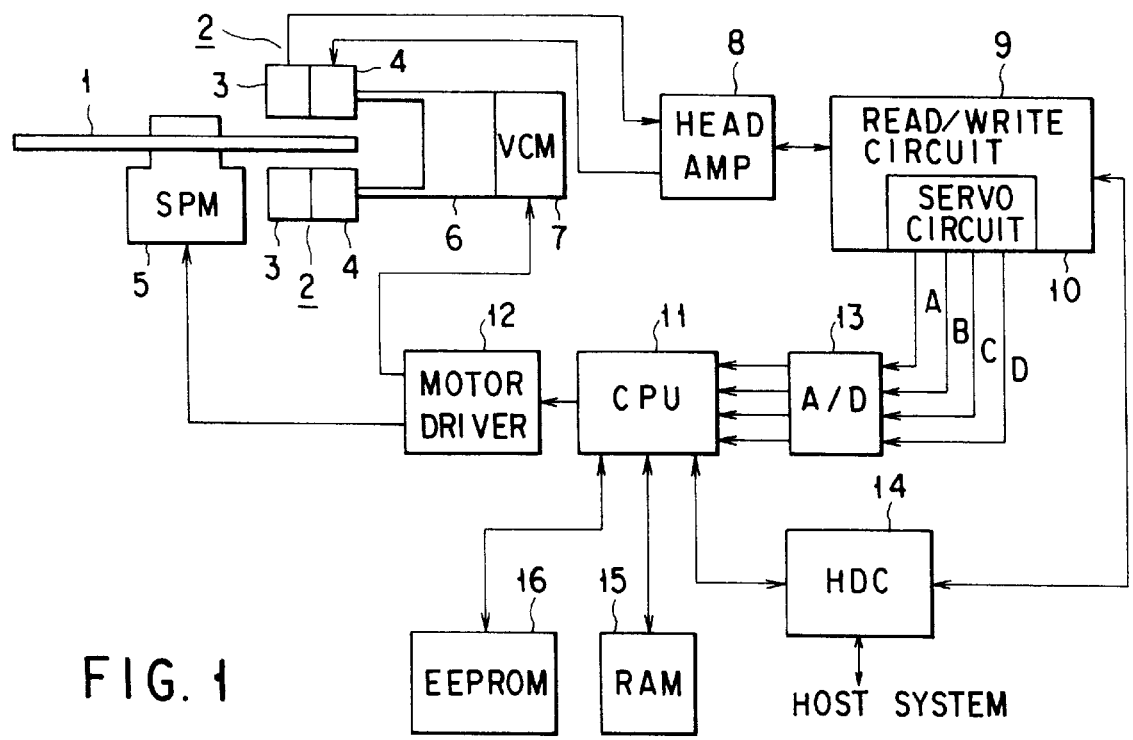
FIG. 1 is a block diagram showing a main part of a HDD relating to the present invention.

FIG. 1 is a block diagram showing a main part of a HDD including a servo system (or head positioning control system) relating to each of the embodiments. (Structure of HDD)

The embodiments will be explained supposing an HDD using read/write separation type head units 2. In this type of head unit, a read head (MR head) 3 and a write head 4 are equipped on one same slider. Head units 2 are respectively provided on each of both surfaces of a disk 1 as a storage medium, such that the head units are respectively opposed to the surfaces of the disk 1.

Other than the disk 1 and head units 2, the HDD includes a spindle motor (SPM) 5, a head actuator 6, a voice coil motor (VCM) 7, and a motor driver 12. The spindle motor 5 causes one or a plurality of disks 1 (although one disk is supposed in the present description) to rotate at a high speed. The head actuator 6 is a head moving mechanism for holding the head units 2 and moving the head units 2 in the radial direction of the disk 1. The motor driver 12 is a drive circuit which is controlled by the CPU 11 by means of control values set as digital values, to drive the VCM 7 and the SPM 5. In head movement control, the motor drive 12 supplies the VCM 7 with a drive current according to a control amount (of digital value) from the CPU 11.

The HDD further has a head amplifier circuit 8, a read/write circuit 9, a servo circuit 10, a CPU 11, an A/D converter 13, a hard disk controller (HDC) 14, a RAM 15, and an EEPROM 16. The head amplifier circuit 8 is a driver IC for the read heads 3 and write heads 4 and includes a read amplifier for amplifying a read signal read out by a read head 3 and a write amplifier for supplying a write current to the write heads 4. The read/write circuit 9 is normally a specialized integrated circuit (called a read channel or a read/write channel) and is a signal processing circuit for a read/write signal. The read/write circuit 9 is inputted with a read signal read out by a read head 3 through the head amplifier circuit 8, and executes various signal processing to decode the signal into an original of data (or read data). In addition, the read/write circuit 9 outputs, to the head amplifier circuit 8, a write signal obtained by modulating write data from the HDC 14 by a predetermined modulation method (such as a RLL method). The head amplifier circuit 8 converts a write signal into a write current and outputs the current to a write head 4.

The HDC 14 constitutes an interface between a HDD and a host computer, and controls transfer of read/write data and access commands (or read/write commands) between the HDD and the host computer. The CPU 11 receives an access command from a host computer through the HDC 14 and executes data access control including head positioning control with respect to the disk 1.

A servo system relating to the present invention is constituted mainly by the CPU 11 and the servo circuit 10. The servo circuit 10 is normally included in the read/write circuit 9, and includes a sample hold circuit for extracting respective analog signals (or position signals) concerning servo burst data (e.g., burst patterns a to d) from a read signal from a read head 3. The A/D converter 13 converts levels of the analog signals extracted by the servo circuit 10, into digital values (which will be hereinafter called burst data items A to D), and outputs the values to the CPU 11. The CPU 11 is a microprocessor forming a main control unit for the HDD.

In head positioning control, the CPU 11 executes calculation processing of calculating position information necessary for position control, with use of burst data items A to D inputted from the A/D converter 13. The CPU 11calculates a control amount (of a digital value) for controlling a head (or read head 3) to be positioned within a specified track range, based on the calculated position information, and outputs the control amount to the motor driver 12. The motor driver 12 has a D/A converter and converts the control amount into an analog drive current which is then supplied to the VCM 7. The EEPROM 16 is a rewritable non-volatile programmable ROM which stores a speed table required for seek control, for example. The RAM (random access memory) 15 is a read/write memory which is a work memory for storing data required for various control processing executed by the CPU 11.

First Embodiment

Figure 3:
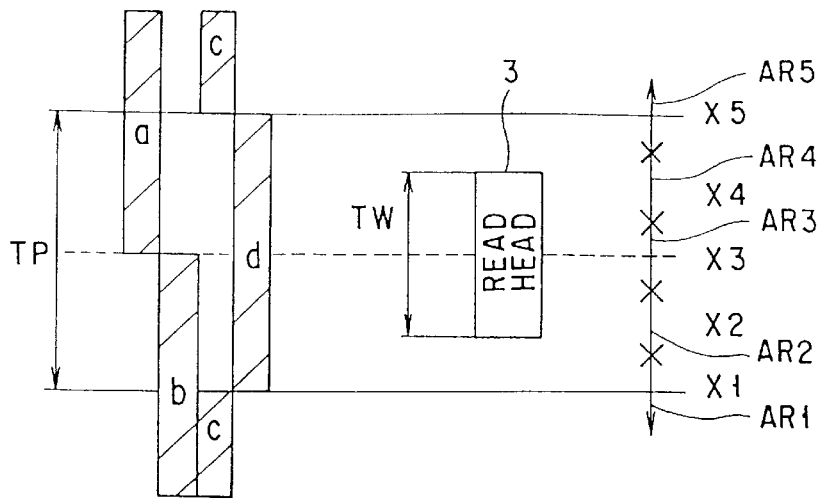
FIG. 3 is a view showing a relationship between a head and track positions, relating to the embodiment.

In the servo system, the CPU 11 executes seek control for moving a read head 3 to a specified track (or cylinder) as an access target, upon receipt of a command (or read command) requesting read access from a host system (such as a personal computer or the like). The CPU 11 further executes position control (called track following control) for positioning the read head 3 within the range of the specified track (N), sequentially following the seek control. In the position control, the CPU 11 normally controls the read head 3 to be positioned in the center of the specified track (N). In write access, the CPU 11 also control a write head 4 to be positioned in the center of the specified track (N) in association with execution of the position control of the read head 3. FIG. 3 shows a state in which next position control is being started after the read head 3 is moved to the specified track (N).

In the position control, the CPU 11 sample-holds amplitude values of the burst patterns a to d read out by the read head 3 and is further inputted with burst data items A to D converted into digital values by the A/D converter 13. The CPU 11 uses the inputted burst data items A to D to execute calculation processing for position information for detecting the position of the read head 3 (or a positional displacement from a reference position). Based on the position information thus calculated, the CPU 11 detects a positional displacement of the read head 3 and drives and controls the VCM 7 to eliminate the positional displacement. As a result of this, the read head 3 is controlled to be positioned, for example, at the center X3 of the specified track (N). Specifically, the CPU 11 generates a control amount which eliminates the calculated position information (or positional displacement information) to be zero, and outputs the control amount to the motor driver 12, thereby to drive and control the VCM 7.

Calculation Method for Calculating Position Information According to First Embodiment In a calculation method for position information, relating to respective embodiments of the present invention, the track range (TP) of a specified track is divided into five areas AR1 to AR5, for example, as shown in FIG. 3. Specifically, the area AR3 regards a center position X3 of the track range as a reference. The area AR5 regards a boundary position X5 between tracks as a reference. The area AR4 regards a center position X4 between the positions X3 and X5, as a reference. The area AR2 regarding a position X2 as a reference and the area AR1 regarding a position X1 as a reference are basically treated in the same manners as the area AR4 regarding the center position X4 as its reference and the area AR5 regarding the boundary position X5 as its reference, respectively, except that the areas AR1 and AR2 are arranged in the opposite direction. Therefore, explanation of the areas AR1 and AR2 will be omitted from the following, and also from second and third embodiments described later.

When the read head 3 is to be positioned at the vicinity of the center position X3 in the track range, i.e., within the range of the area AR3, the CPU 11 executes calculation processing for position information, as follow.

$$PI=\{(A-B)/(A+B)\}*K \quad (2)$$

Figure 2:
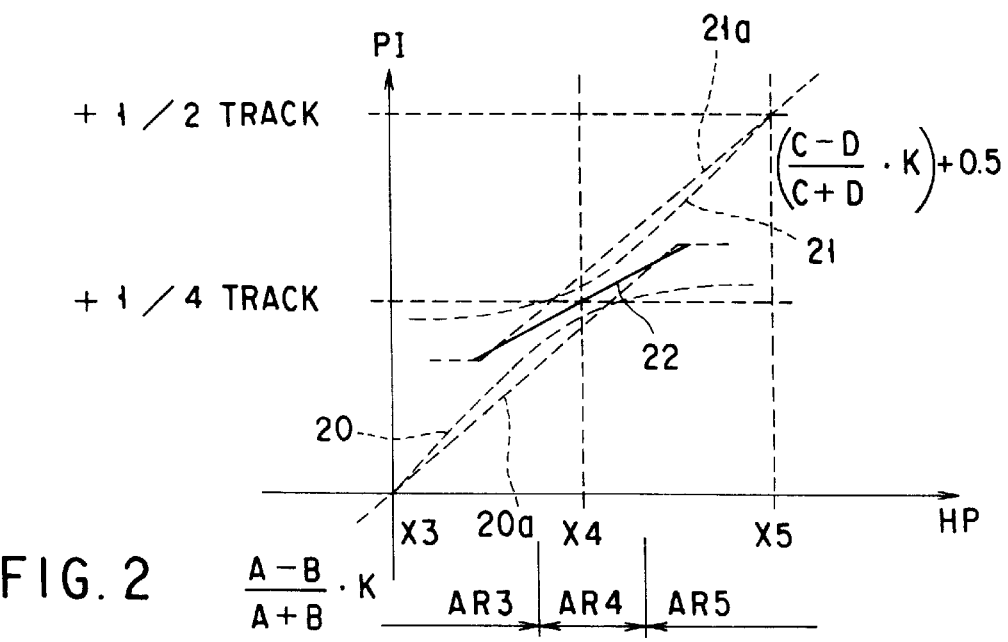
FIG. 2 is a graph showing a calculation method for position information, relating to a first embodiment of the present invention.

Specifically, as shown in FIG. 3, the read head 3 reads amplitude values corresponding to positions, from the burst patterns a and b arrayed in an orthogonal array. Since the CPU 11 is capable of obtaining digital values of the burst data items A and B corresponding to the amplitude values of the read signals from the read head 3, the CPU 11 executes the calculation formula (2) which is effective for calculating position information having a linearity with respect to the head position. As a result of this, it is possible to calculate position information 20 maintaining a linearity with the center position X3 regarded as a reference, within the range of the area AR3, as shown in FIG. 2.

If the read head 3 is out of the range of the area AR3, one of the values of the burst data items A and B is "0", and therefore, the CPU 11 is capable of recognizing this condition. Accordingly, the CPU 11 controls the read head 3 to move so that both of the burst data items A and B have effective values, and in this manner, the read head may be set within the range of the area AR3. Thereafter, calculation processing for position information, as described above, is executed, to further carry out accurate position control within the range of the area AR3.

When the read head 3 is to be positioned in the vicinity of the boundary position X5 in the track range, i.e., within the range of the area AR5, the CPU 11 executes calculation processing (3) as follows.

$$PI=\{(C-D)/(C+D)\}*K+0.5 \quad (3)$$

Specifically, as shown in FIG. 3, the read head 3 reads amplitude values corresponding to positions, from the burst patterns c and d arranged in an orthogonal array. Since the CPU 11 is capable of obtaining digital values of the burst data items C and D corresponding to the amplitude values of the read signals from the read head 3, the CPU 11 executes the calculation formula (3) which is effective for calculating position information having a linearity with respect to the head position. As a result of this, it is possible to calculate position information 21 maintaining a linearity with the center boundary X3 regarded as a reference, within the range of the area AR5, as shown in FIG. 2.

In the calculation formula (3), "0.5" means a shift mount equivalent to a half track. In FIG. 2, position information 20a and position information 21a respectively indicate position information characteristics having an ideal linearity in position control of the servo system.

If the read head 3 is out of the range of the area AR5, one of the values of the burst data items C and D is "0", and therefore, the CPU 11 is capable of recognizing this condition. Accordingly, the CPU 11 controls the read head 3 to move so that both of the burst data items A and B have effective values, and in this manner, the read head may be set within the range of the area AR3. Thereafter, calculation processing for position information, as described above, is executed, to further carry out accurate position control within the range of the area AR5.

When the read head 3 is to be positioned in the vicinity of the center position X4 in the track range, i.e., within the range of the area AR4, the CPU 11 executes calculation processing for position information, as follow.

$$PI=(PIa+PIb)/2 \quad (4)$$

In the above calculation formula, PIa denotes a calculation result PI of the calculation formula (2), and PIb denotes the calculation result PI of the calculation formula (3). Thus, the calculation formula (4) is a to obtain an average value of position information of the calculation results of the calculation formulas (2) and (3).

Specifically, as shown in FIG. 3, the read head 3 reads amplitude values corresponding to positions, from the burst patterns a, b, c, and d arrayed in an orthogonal array, within the range of the area AR4. Since the CPU 11 is capable of obtaining digital values of the burst data items A, B, C and D corresponding to the amplitude values of the read signals from the read head 3, the CPU 11 executes the calculation (4) which is effective for calculating position information having a linearity with respect to the head position. As a result of this, it is possible to calculate position information 22 maintaining a linearity with the boundary position X4 regarded as a reference, within the range of the area AR4, as shown in FIG. 2.

As has been described above, according to the present embodiment, the track range of a specified track is divided into areas AR3, AR4, and AR5 respectively based on reference positions X3, X4, and X5. The CPU 11 selects effective calculation formulas (2 to 4) for the areas AR3, AR4, and AR5, respectively, to calculate position information having a linearity. Therefore, as shown in FIG. 2, it is possible to obtain position information 20, 21, and 22 which maintains a linearity with respect to the head position HP within the all the areas of the track range. In other words, it is consequently possible to reduce occurrence of discontinuity of position information within the track range, so that the range in which position information having a linearity can be obtained can be enlarged (particularly with respect to the area AR4).

Second Embodiment

A calculation method of position information relating to a second embodiment will be explained with reference to FIGS. 4 and 5.

The present embodiment is a method of calculating position information averaged over the entire area of a track range, with use of both of position information PIa{PIa={(A−B)/(A+B)} calculated from burst data items A and B and position information PIb{PIb=(C−D)/(C+D)} calculated from burst data items C and D.

Figure 4:
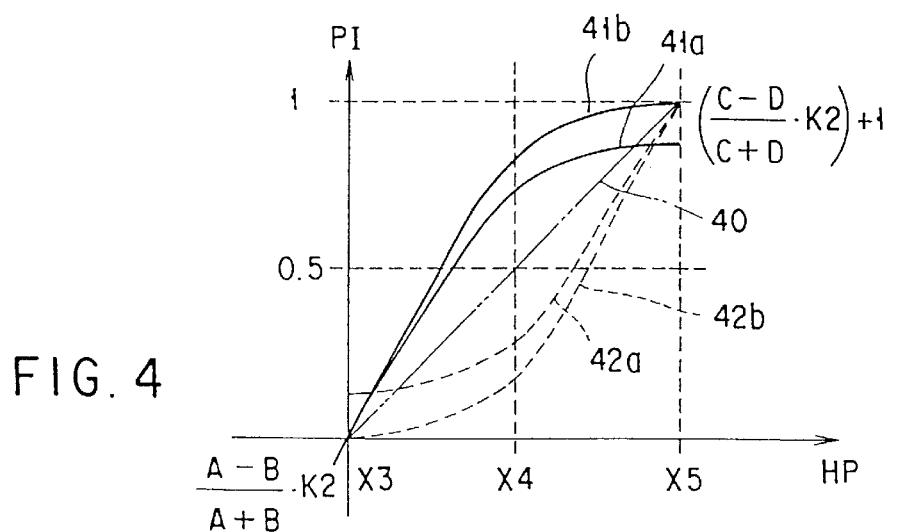
FIGS. 4 and 5 are graphs explaining a calculation method for position information relating to a second embodiment.

Specifically, *PIa={(A−B)/(A+B)}*K2* is supposed as the position information PIa, and the conversion factor K2 is set such that the PIa is "1" with respect to the boundary position X5 and is "0" at the center position X3 (as shown in FIG. 4). In practice, with a read head 3 kept held at the center position X3, burst data items A and B are measured. This measurement is carried out for several tracks, and the conversion factor K2 is determined from the average value of the measurement. In FIG. 4, the line 40 indicates an ideal characteristic, and the continuous line 41a indicates a characteristic of a current position information PIa (PIa=(A−B)/(A+B)). In contrast, the continuous line 41b indicates a characteristic of position information PIb (PIb={(A−B)/(A+B)}*K2) according to the present embodiment. The broken line 42a indicates a characteristic of position information PIb {PIb=(C−D)/(C+D)}. In contrast, the broken line 42b indicates a characteristic of position information PIb ({PIb=(C−D)/(C+D)}*K2+1).

The CPU 11 calculates position information PIc averaged over the entire area within the track range, by the following calculation formula (5) using position information PIa and PIb including the conversion factor K2.

$$PIc=\{(PIa/2)+(PIb/2)\}/2 \tag{5}$$

Figure 5:
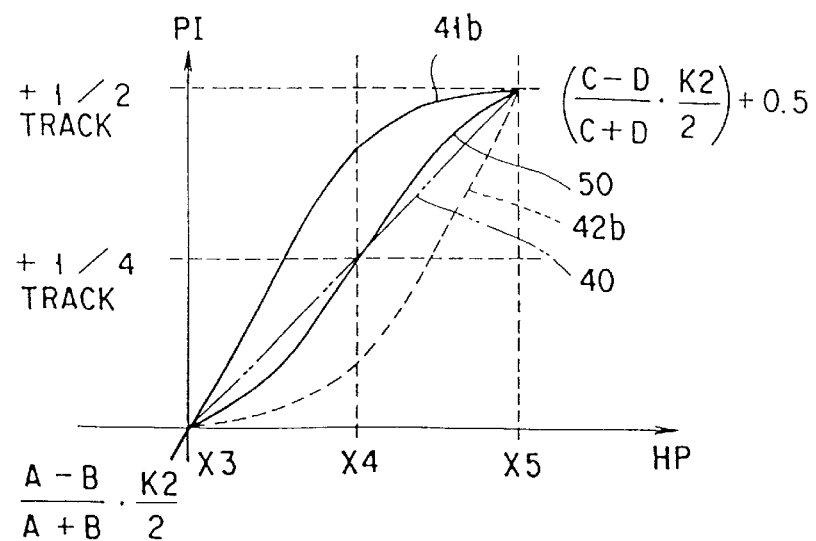

Thus, it is possible to calculate average position information PIc, as indicated by a continuous line 50 in FIG. 5. Therefore, according to the present embodiment, position information averaged over the entire area of a track range can be obtained with use of both of position information PIa and position information PIb calculated from burst data items C and D. As a result of this, as shown in FIG. 5, it is possible to position information maintaining a linearity within the track range, and consequently, occurrence of discontinuity of position information like in a conventional method can be reduced. In other words, the range in which position information having a linearity can be obtained can be enlarged.

Third Embodiment

A calculation method of position information relating to a third embodiment will be explained with reference to FIGS. 6 and 7.

The present embodiment is a method of calculating position information averaged over the entire area of a track range, by averaging weights of respective position information values, with both of position information PIa {PIa={(A−B)/(A+B)} calculated from burst data items A and B and position information PIb {PIb=(C−D)/(C+D)} calculated from burst data items C and D.

Figure 6:
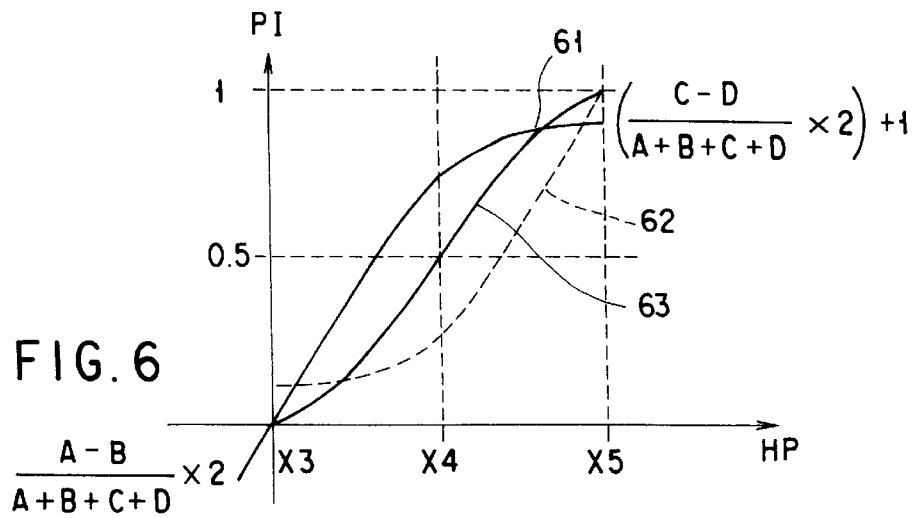
FIGS. 6 and 7 are graphs explaining a calculation method for position information relating to a second embodiment.

Specifically, PId={(A−B)/(A+B+C+D)}*K3 is supposed as position information PId, and the conversion factor K3 is set so that the PId is "1" at the boundary position X5 and is "0 " at the center position X3 (as shown in FIG. 6). In FIG. 6, the continuous line 61 indicates a characteristic of the position information PId. The broken line 62 indicates a characteristic of PIe={(C−D)/(A+B+C+D)}*K3+1 as position information PIe (where K3=2).

Figure 7:
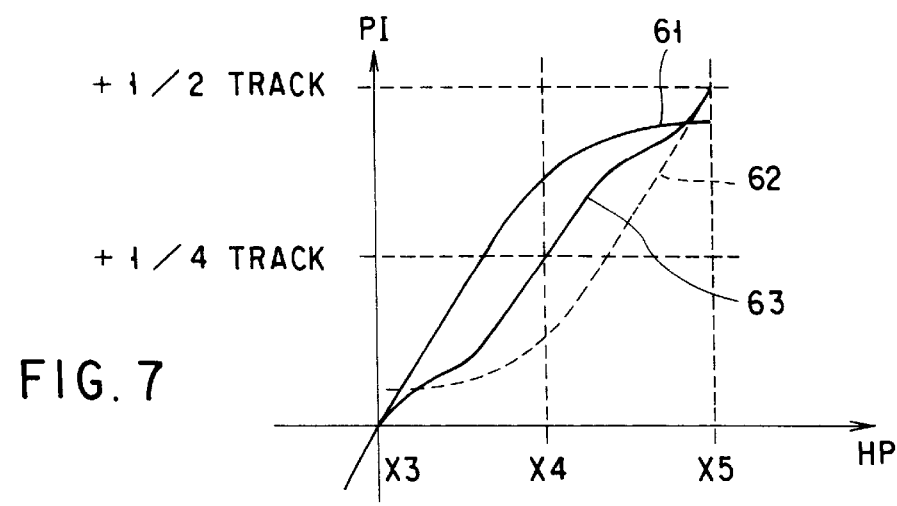
Figure 8:
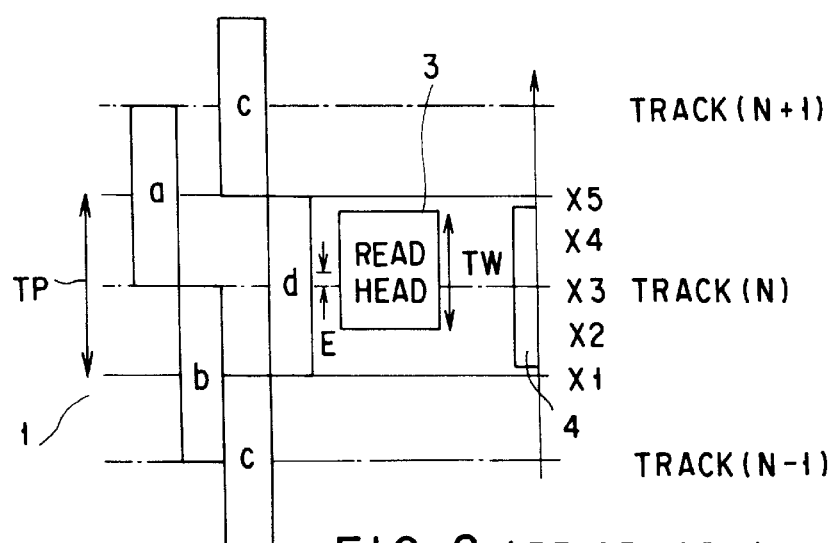
FIG. 8 is a view showing a relationship between servo burst data and head positions, relating to a servo system of a conventional HDD.
Figure 9:
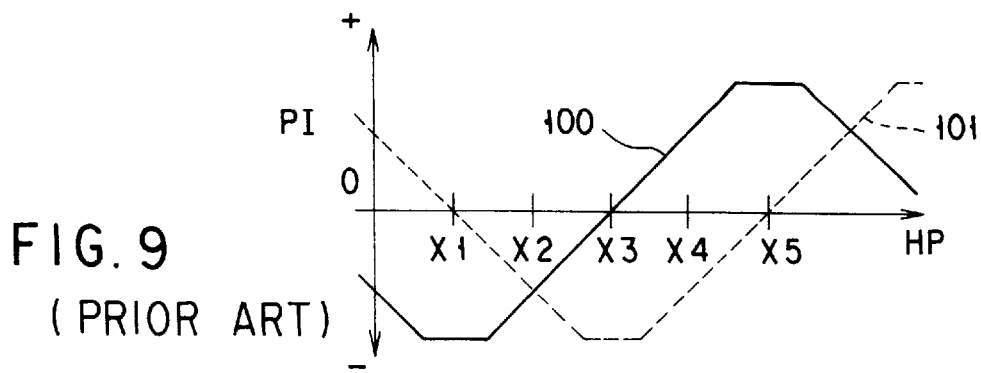
FIGS. 9 to 12 and 14 to 16 are graphs showing relationships between head positions and position information.
Figure 10:
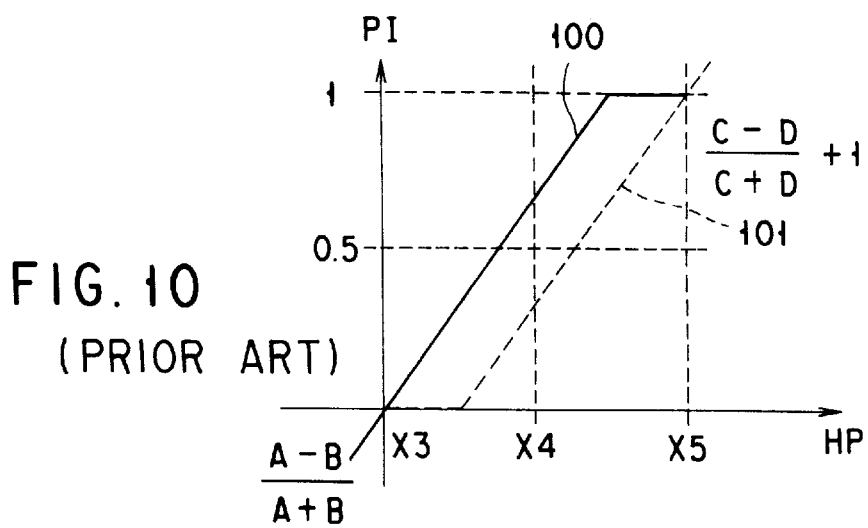
Figure 11:
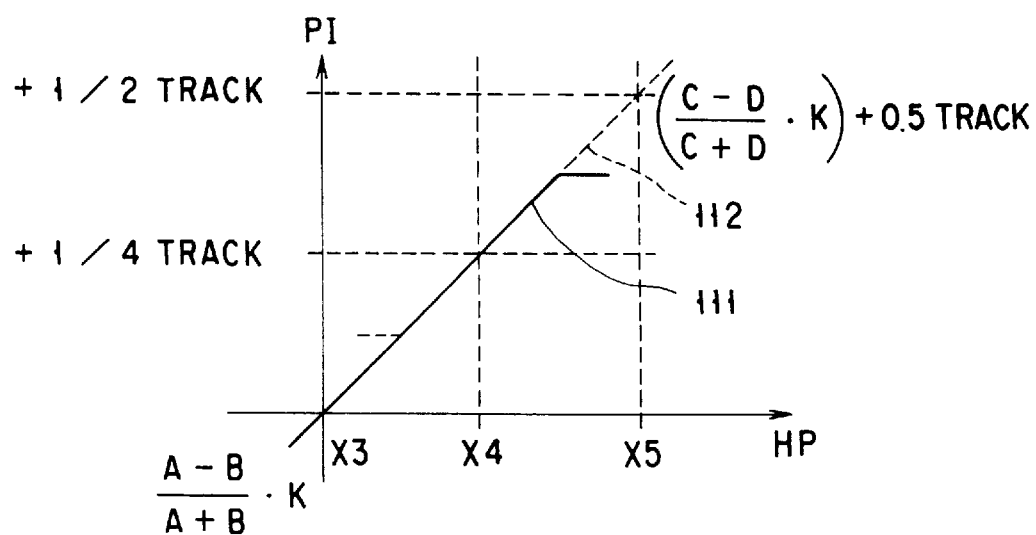
Figure 12:
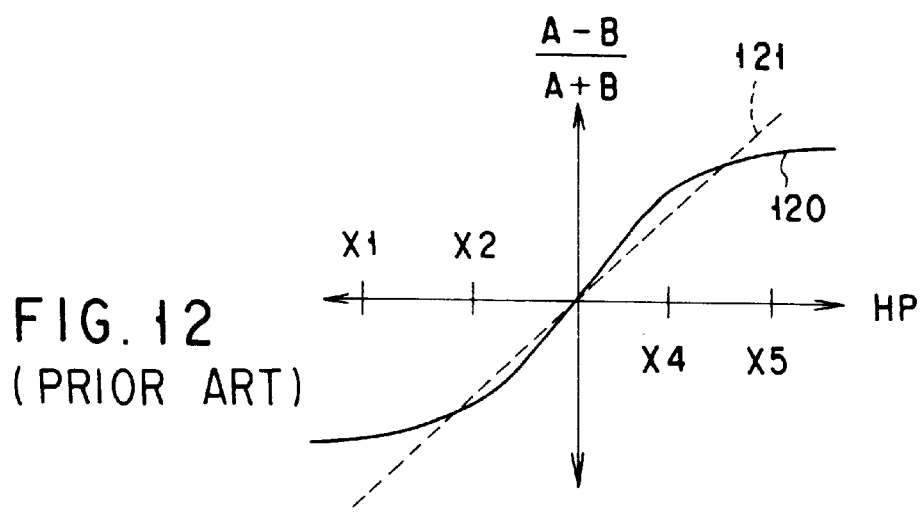
Figure 13:
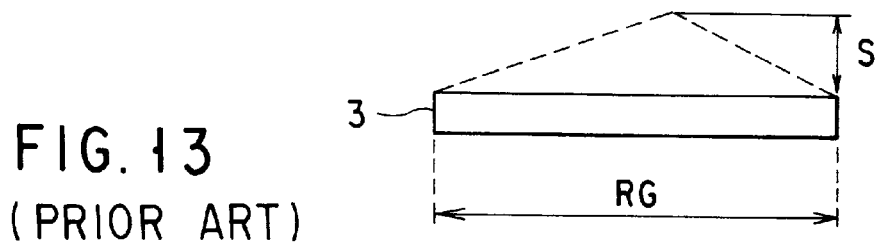
FIG. 13 is a view for explaining a read sensitivity characteristic of a conventional read head.
Figure 14:
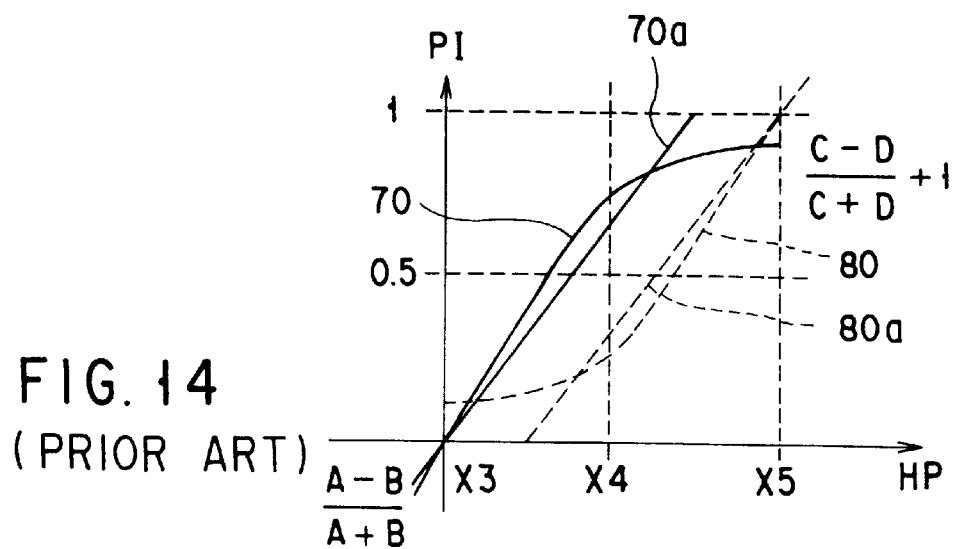
Figure 15:
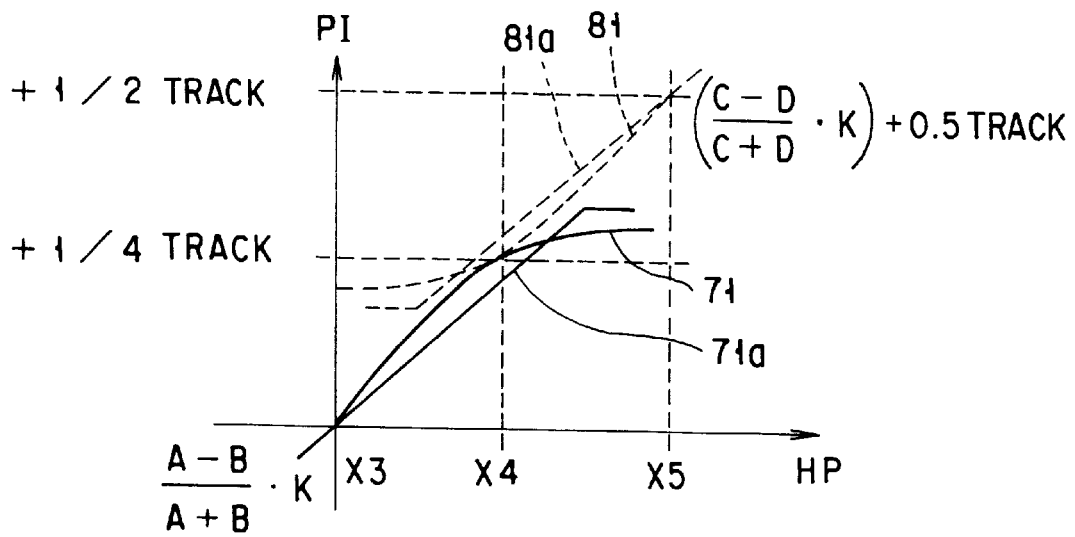
Figure 16:
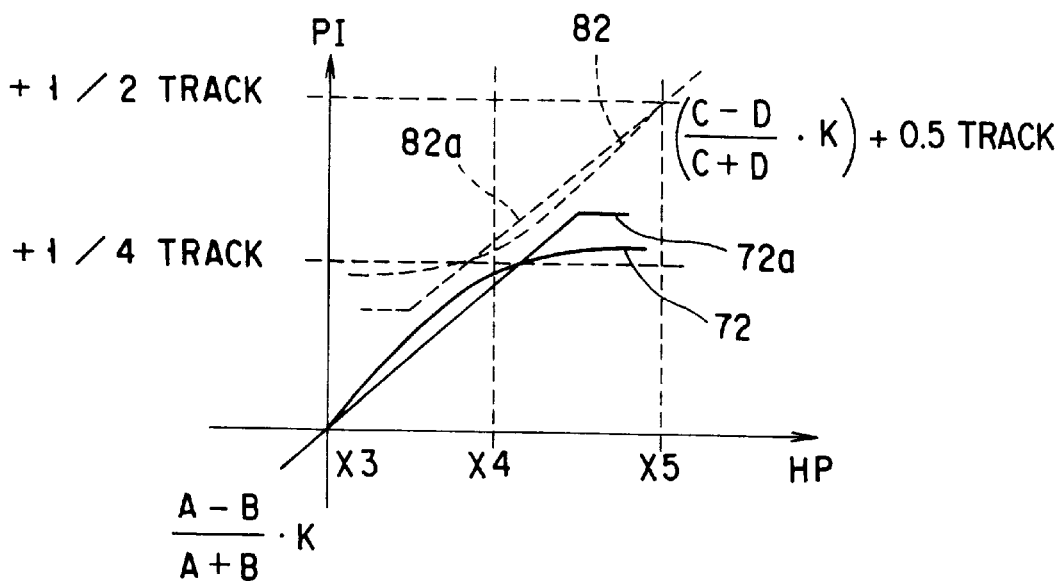

In FIG. 7, the broken line 63 indicates a characteristic of position information obtained by multiplying the values of the position information described above by weights of α and β. However, the weights factors α and β are determined so as to satisfy the following (6).

$$X3{:}\alpha{=}1,\ \alpha{=}0$$

$$X5{:}\alpha{=}0,\ \beta{=}0 \tag{6}$$

Next, position information 63 indicating an actual head position is calculated by the calculation formula (8) described below (as shown in FIG. 7).

Examples of α and β in the calculation formula (8) are supposed as in the following (7).

$$\alpha = \frac{|A-B|}{|A-B|+|C-D|}\ \ \beta = \frac{|C-D|}{|A-B|+|C-D|} \tag{7}$$

Next, the weight factors α and β obtained by the above processing are used to calculate position information 63 indicating the actual head position, by the following calculation formula (8) (as shown in FIG. 7).

$$\left\{\left\{\frac{A-B}{A+B+C+D}\times 2\right\}\times\beta+\left\{\frac{C-D}{A+B+C+D}\right\}\times 2+0.5\right\}\times\alpha \tag{8}$$

Where the above examples of α and β are used, the position information indicating the actual head position can be calculated by the following calculation formula (9).

$$\left(\frac{(A-B)}{|A-B|+|C-D|}\right)\times 0.5 \tag{9}$$

Thus, it is possible to obtain a position information characteristic which maintains a linearity as indicated by the continuous line 63 in FIG. 7, so that occurrence of discontinuity of position information like in a conventional method can be reduced. In other words, the range in which position information having a linearity can be obtained can be enlarged.

As has been described above, according to the present invention, when obtaining a position of a head (or a positional displacement from a reference position) within a range of a specified track on a disk, position information maintaining a linearity with respect to the head position can be calculated with use of servo burst data items A, B, C, and D. This means that it is consequently possible to reduce occurrence of position information having discontinuity within the range of a specified track. In other words, within the range of a specified track, the range in which position information having a linearity can be obtained can be enlarged, so that accuracy of head positioning control can be improved. In particular, a head positioning control system having high performance can be realized if the present invention is applied to a HDD.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for positioning control of a head in a disk storage drive, the drive having a disk with prerecorded servo burst data, the servo burst data including burst data items A and B arranged orthogonally with respect to a track center line, and burst data items C and D arranged orthogonally with respect to a boundary position between tracks, said system comprising:

setting means for setting calculation formulas for calculating position information corresponding to a position of the head within a range of a specified track with use of the servo burst data, the specified track being divided into a first area regarding the track center line as a reference position, a second area regarding the boundary position between the tracks as a reference position, and a third area regarding a middle position between the reference positions as a reference position, the calculation formulas having a first calculation formula for calculating the position information of the head within the first area with use of the burst data items A and B, a second calculation formula for calculating the position information of the head within the second area with use of the burst data items C and D, and a third calculation formula for calculating the position information of the head within the third area with use of an average value of calculation results by the first and second calculation formulas;

calculating means for selecting a calculation formula corresponding to an area in which the head is positioned within the range of the specified track, among the calculation formulas set by said setting means, thereby to calculate the position information corresponding to the position of the head within the range of the specified track; and control means for controlling the head to be positioned within the range of the specified track, based on the position information calculated by said calculating means.

2. The system according to claim 1, wherein the head is a read/write separation type head comprising a read head and a write head, and the read head has head width smaller than the range of the track.

3. A disk storage drive having a head, a disk with prerecorded servo burst data, and a servo system for positioning control of the head onto the disk, said storage means comprising:

read means for reproducing burst data items A and B when the head is positioned in a first area, for reproducing burst data items C and D when the head is positioned in a second area, and for reproducing the burst data items A and B and the burst data items C and D when the head is positioned in a third area, where the servo burst data consists of the burst data items A and B arranged orthogonally with respect to a boundary position between the tracks, and where the range of the track is set to be divided into the first area regarding the track center as a reference position, the second area regarding the boundary position between the tracks as a reference position, and the third area regarding a middle position between the reference positions as a reference position;

calculating means for calculation position information having a linearity with respect to a position of the head, by a first calculation formula using the burst data items A and B, in the first area, for calculating position information having a linearity with respect to a position of the head, by a second calculation formula using the burst data items AC and BD, in the second area, and for calculating an average value of calculation formulas, as position information of the head, with use of the burst data items A and B and the burst data items C and D, in the third area; and control means included in the servo system, for controlling the head to be positioned within a range of a specified track, based on the position information calculated by the calculating means.

4. A method of positioning control for positioning a head onto a disk in a disk storage drive, the method comprising the steps of:

reproducing burst data items A and B when the head is positioned in a first area reproducing burst data items C and D when the head is positioned in a second area, and reproducing the burst data items A and B and the burst data items C and D when the head is positioned in a third area, where servo burst data consists of the burst data items A and B arranged orthogonally with respect to a track center of a range of a track on the disk, and burst data items C and D arranged orthogonally with respect to a boundary position between tracks, and where the range of the track is set to be divided into the first area regarding the track center as a reference position, the second area regarding the boundary position between the tracks as a reference position, and the third area regarding a middle position between the reference positions, as a reference position;

calculating position information having a linearity with respect to a position of the head, by a first calculation formula using the burst data items A and B, in the first area, calculating position information having a linearity with respect to a position of the head, by a second calculation formula using the burst data items C and D, in the second area, and calculating an average value of calculation results from the first and second calculation formulas, as position information of the head, with use of the burst data items A and B and the burst data items C and D in the third area; and controlling the head to be positioned within a range of a specified track, based on the position information calculated.

* * * * *

UNITED STATES PATENT AND TRADEMARK OFFICE
CERTIFICATE OF CORRECTION

PATENT NO.    : 6,175,465 B1
DATED         : January 16, 2001
INVENTOR(S)   : Hidetoshi Kawachi et al.

It is certified that error appears in the above-identified patent and that said Letters Patent is hereby corrected as shown below:

<u>Column 12,</u>
Lines 5, 9, 39 and 42, after "head", delete the comma ",".
Lines 7 and 40, after "A and B", delete the comma ",".
Line 10, "AC and BD, in" should read -- C and D in --.
Lines 13 and 43, after "C and D", delete the comma ",".
Line 23, after "first area", insert a comma -- , --.
Line 37, after "positions", delete the comma ",".

Signed and Sealed this

Second Day of December, 2003

JAMES E. ROGAN
*Director of the United States Patent and Trademark Office*